Figure 1:
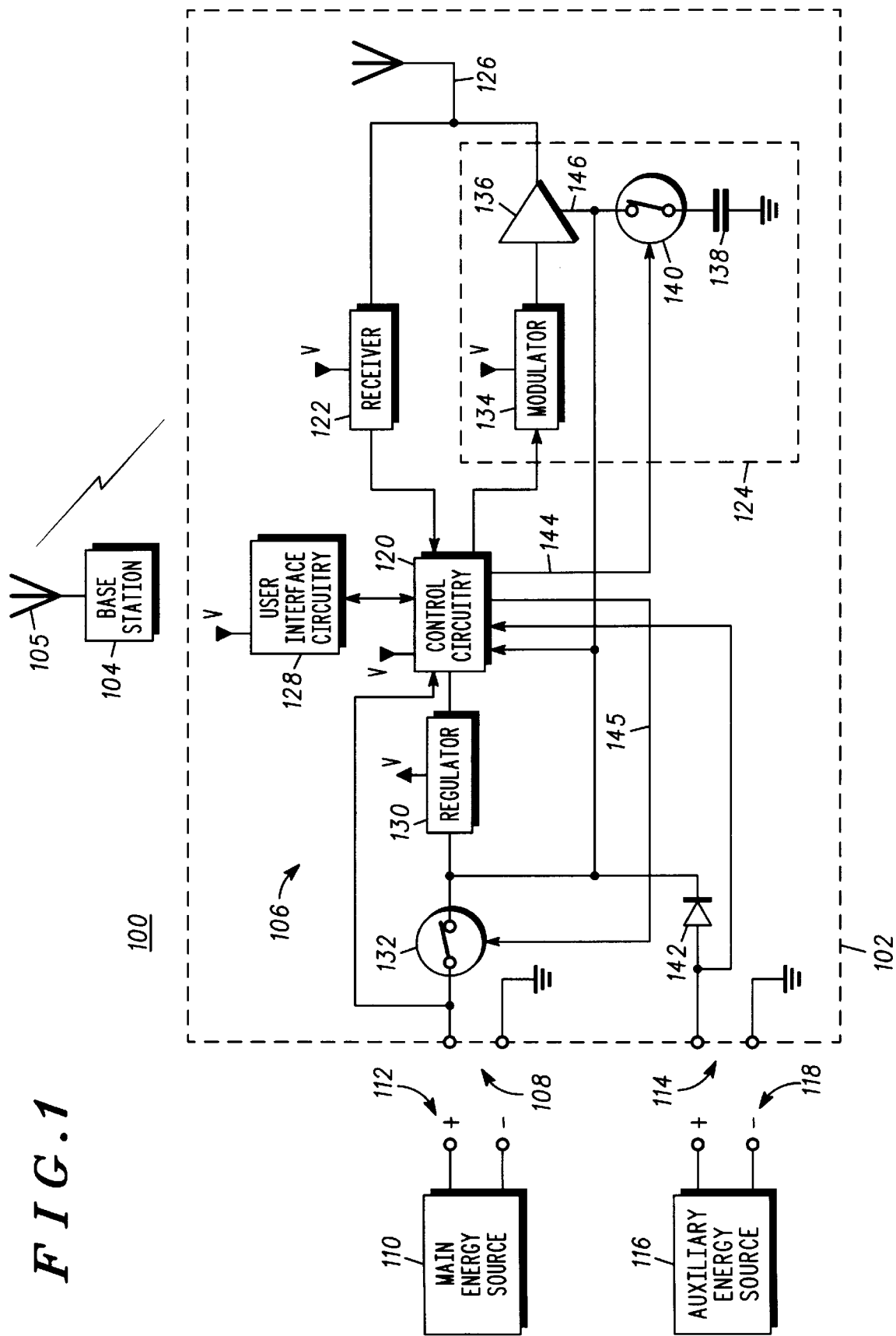

United States Patent [19]
Rabe et al.

[11] Patent Number: 6,097,973
[45] Date of Patent: Aug. 1, 2000

[54] ELECTRONIC CIRCUIT FOR A PORTABLE ELECTRONIC DEVICE

[75] Inventors: Duane Rabe, Hawthorne Woods; William P. Alberth, Jr.; Louis J. Vannatta, both of Crystal Lake, all of Ill.

[73] Assignee: Motorola, Inc., Schaumburg, Ill.

[21] Appl. No.: 08/994,734

[22] Filed: Dec. 19, 1997

[51] Int. Cl.[7] .............................. H04B 1/38; H01Q 11/12; H03F 3/04; H02J 3/32
[52] U.S. Cl. ..................... 455/572; 455/127; 455/117; 455/574; 330/297; 330/127; 320/166
[58] Field of Search ................... 455/572, 571, 455/574, 117, 127; 330/51, 127, 207 P, 297; 307/46, 48, 64, 66, 85, 86, 87; 320/166

[56] References Cited

U.S. PATENT DOCUMENTS

| | | | |
|---|---|---|---|
| 4,636,741 | 1/1987 | Mitzlaff | 455/99 |
| 4,962,523 | 10/1990 | Tanaka | 455/127 |
| 5,164,652 | 11/1992 | Johnson et al. | 455/572 |
| 5,423,078 | 6/1995 | Epperson et al. | 455/93 |
| 5,439,756 | 8/1995 | Anani et al. | 429/9 |
| 5,587,250 | 12/1996 | Thomas et al. | 429/3 |
| 5,590,414 | 12/1996 | Marui et al. | 455/89 |
| 5,590,419 | 12/1996 | Shimo | 455/127 |
| 5,613,229 | 3/1997 | Baranowski et al. | 455/127 |
| 5,646,977 | 7/1997 | Koizumi | 455/572 |
| 5,686,813 | 11/1997 | Huen et al. | 320/166 |
| 5,818,125 | 10/1998 | Manchester | 307/64 |
| 5,857,151 | 1/1999 | Heinonen et al. | 455/89 |
| 5,862,493 | 1/1999 | Barkat et al. | 455/572 |
| 5,877,564 | 5/1999 | Kuiri | 455/572 |
| 5,914,538 | 6/1999 | Kurosawa et al. | 307/66 |
| 5,925,942 | 7/1999 | Theobald | 455/573 |
| 5,943,223 | 8/1999 | Pond | 363/21 |

FOREIGN PATENT DOCUMENTS

| | | |
|---|---|---|
| 40203/95 | 6/1996 | Australia . |
| 0 239 393 B1 | 9/1992 | European Pat. Off. . |
| 0239393B1 | 9/1992 | European Pat. Off. . |
| 2 261 129 | 5/1993 | United Kingdom ............ H01F 7/18 |

OTHER PUBLICATIONS

Motorola Journal of Sccience and Technology vol. 5, No. 2, "Effect of Connecting a Capacitor in Parallel to ma Batterry Pack" H.patel, G. Fougere, J. Howard, and H. Wu, 1996, pp. 32–41.

Electronic Engineering Times Issue 923, "Supercapacitor powers new applications" by Ashok Bindra, 2 pages, Oct. 1996.

Motorola Journal of Science and Technology, vol. 5, No. 2, "Effect of Connecting a Capacitor in Parallel to a Battery Pack" by H. Pate. G. Fougere, J. Howard, and H. Wu, 1996, pp. 32–41.

Electronic Engineering Times, Issue 923, "Supercapacitor powers new applications" by Ashok Bindra, Oct. 14, 1996, 2 pages.

Primary Examiner—Edward F. Urban
Assistant Examiner—Rafael Perez-Gutierrez
Attorney, Agent, or Firm—John J. Oskorep; Brian M. Mancini; Michael C. Soldner

[57] ABSTRACT

An electronic circuit (200) for a portable electronic device includes an energy source interface (202), a load (204) coupled to the energy source interface (202), an energy storage circuit (206) having a maximum operating voltage, and a switch circuit (208). The switch circuit (208) is coupled to the energy source interface (202) in series with the energy storage circuit (206). The switch circuit (208) operates to switchably decouple the energy storage circuit (206) in response to a voltage at the load (204) that exceeds the maximum operating voltage.

27 Claims, 2 Drawing Sheets

ELECTRONIC CIRCUIT FOR A PORTABLE ELECTRONIC DEVICE

FIELD OF THE INVENTION

The present invention relates generally to the field of electronic circuits for portable electronic devices.

BACKGROUND OF THE INVENTION

Consumer markets continue to request portable electronic devices that are smaller and provide more advanced features. Examples of such devices include compact disc players, two-way radios, cellular telephones, and computer devices to name but a few. As such devices become smaller, the demand for smaller portable energy sources to power these devices increases.

Electronic circuits operating at lower voltages have helped reduce energy consumption of such devices and, accordingly, have helped reduce the sizes of the portable energy sources required to operate the devices over reasonable periods of time. Some circuits, such as amplifier circuits, however, continue to operate most efficiently at higher voltages.

Despite low voltage advancements, a portable energy source may still be too bulky, too heavy, or may not last long enough for many high power applications. For one, a portable energy source, such as a battery or battery pack, must often deal with short term surges in currents drawn by a device. The battery must be robust enough to provide a peak current that may be substantially higher than an average current of the device. Therefore, the battery may often have a larger size to meet the power requirements of the device even though a smaller battery would be sufficient for the energy requirements.

To help alleviate these problems, a device may be powered by an energy system that includes a capacitor connected in parallel with a smaller battery. Here, the capacitor effectively lowers an impedance of the energy system. During a current pulse, a properly selected capacitor will reduce a voltage drop in the system because of its lower equivalent series resistance (ESR). To keep size and weight to a minimum, the capacitor may be chosen to have a maximum operating voltage not substantially greater than an operating voltage of the device.

In addition to having a main energy source interface for connecting with a main energy source, a device may include an auxiliary energy source interface to connect with an auxiliary energy source. An auxiliary energy source may be a larger energy source, such as an automobile battery, that does not present the problems associated with smaller batteries. Thus, an operator of the device has an option to prolong the operating time of the device by using the auxiliary energy source. An auxiliary energy source may provide a nominal operating voltage that is larger than that of the main energy source.

Accordingly, what is needed is an electronic circuit that accommodates and further supports these and similar needs of portable electronic devices, and especially one that is suitable for low voltage applications with large current pulse requirements.

BRIEF DESCRIPTION OF THE DRAWINGS

FIG. 1 is a schematic block diagram of a communication system including a mobile station and a base station, showing an electronic circuit of the mobile station.

FIG. 2 is a schematic diagram of an electronic circuit of a simplified alternative embodiment.

DETAILED DESCRIPTION OF THE PREFERRED EMBODIMENTS

An electronic circuit for a portable electronic device includes an energy source interface configured for coupling with an energy source, a load coupled to the energy source interface, an energy storage circuit having a maximum operating voltage, and a switch circuit. The switch circuit is coupled to the energy source interface in series with the energy storage circuit, and switchably decouples the energy storage circuit from the energy source interface in response to a voltage at the load that exceeds the maximum operating voltage.

FIG. 1 is a schematic block diagram of a communication system 100 that includes a mobile station 102 and a base station 104. Mobile station 102 is a portable electronic device and, more specifically, a portable radio communication device. Mobile station 102 and base station 104 communicate via radio frequency (RF) signals over a radio communication channel.

In this embodiment, communication system 100 is a cellular telephone system and, more specifically, a cellular telephone system operating in accordance with a time-division multiple access (TDMA) protocol, such as a Personal Digital Cellular (PDC) system used in Japan. As is well known, a mobile station operating in accordance with a TDMA protocol is an application requiring pulsed currents. A relatively large current is required during each transmit time slot of the TDMA protocol, whereas a relatively small current is required during each non-transmit time slot, such as in each receive time slot of the TDMA protocol.

Mobile station 102 includes an electronic circuit 106 disposed in a small, portable housing (not shown). Electronic circuit 106 includes an energy source interface 108, an energy source interface 114, control circuitry 120, a receiver 122, a transmitter 124, an antenna 126, user interface circuitry 128, a regulator 130, and a switch circuit 132. Transmitter 124 includes a modulator 134, a power amplifier (PA) 136, an electrochemical capacitor 138, and a switch circuit 140. Receiver 122 and transmitter 124 are coupled to antenna 126 for receiving and transmitting RF signals from and to base station 104 having an antenna 105. Modulator 134 is coupled to control circuitry 120 and to PA 136. PA 136 has a biasing input 146 that is coupled to energy source interface 108. Switch circuit 140 is coupled to energy source interface 108 in series with electrochemical capacitor 138. Electrochemical capacitor 138 has a capacitance preferably greater than 1 mF.

Control circuitry 120 is coupled to receiver 122 for control and for receiving and processing information from RF signals received through antenna 126. In addition, control circuitry 120 is coupled to transmitter 124 for control and for processing and transmitting information with RF signals. In a typical configuration, control circuitry 120 generates control and data information and sends it to modulator 134 for modulation of an RF signal. The modulated RF signal is sent to PA 136 for high power transmission via antenna 12.6 over a communication channel.

Control circuitry 120 is coupled to and has control of switch circuit 132 through a control line 145 and switch circuit 140 through a control line 144. Preferably, switch circuits 132 and 140 each include a field-effect transistor (FET) or power FET (not shown), well-known in the art, appropriately coupled in electronic circuit 106. For example, switch circuit 140 may include a power FET having a source coupled to biasing input 146, a drain coupled to electrochemical capacitor 138, and a gate coupled to control line 144. Preferably, the power FETs are capable of handling at least 0.5 amperes of current and have less than 120 mΩ of "on" resistance. Alternatively, switch circuits 132 and 140 each include a microelectromechanical system (MEMS) designed in more recent technological advancements. In general, a MEMS is a mechanical device or switch often fabricated in an integrated circuit (IC). Preferably, the MEMS has a large standoff voltage and very small "on" resistance.

User interface circuitry 128, also coupled to control circuitry 120, includes circuitry to detect user inputs and to provide user output responses. In a typical configuration, user interface circuitry 128 includes key detection circuitry to detect user-actuated keys (such as telephone and function keys), display circuitry to display information in a display, and a speaker and a microphone (not shown).

Preferably, control circuitry 120 includes a processor or processors, such as a microprocessor and a digital signal processor (DSP), each having a software program and memory for processing, control, and operation.

Energy source interface 108 is coupled to regulator 130 and control circuitry 120 through switch circuit 132, and energy source interface 114 is coupled to regulator 130 through a diode 142 and to control circuitry 120. Energy source interface 108 is electrically and mechanically configured for coupling with an interface 112 of a main energy source 110, and energy source interface 114 is electrically and mechanically configured for coupling with an interface 118 of an auxiliary energy source 116. Preferably, energy source interface 108 includes electrical contacts to make direct contact with electrical contacts of interface 112, and energy source interface 114 includes electrical contacts to make direct contact with electrical contacts of interface 118.

Auxiliary energy source 116 provides a nominal operating voltage that is greater than a nominal operating voltage provided by main energy source 110. The nominal operating voltage of auxiliary energy source 116 is also greater than a maximum operating voltage or a maximum operating voltage rating of electrochemical capacitor 138.

Electronic circuit 106 electrically operates from electrical energy of main energy source 110 and/or auxiliary energy source 116 when connected. When main energy source 110 is connected to energy source interface 108, control circuitry 120 operates to detect whether auxiliary energy source 116 is available at energy source interface 114. If auxiliary energy source 116 is not available, control circuitry 120 closes (or maintains closure of) switch circuits 132 and 140 through control lines 144 and 145. Here, energy source interface 108 is coupled to regulator 130 and electrochemical capacitor 138 is coupled to energy source interface 108 and biasing input 146. Regulator 130 receives electrical energy from main energy source 110 and generates a main supply voltage (V) therefrom.

The main supply voltage biases most circuits of electronic circuit 106. Electrochemical capacitor 138, however, receives continuous or periodic electrical energy from main energy source 110 and is charged to a voltage greater than the main supply voltage. Electrochemical capacitor 138 is provided for efficiency and for reducing low voltage drops due to high current demands of PA 136. PA 136 is therefore biased with a larger voltage for high power transmission and increased efficiency.

If control circuitry 120 detects that auxiliary energy source 116 is available, control circuitry 120 opens (or maintains an open state of) switch circuits 132 and 140 through control lines 144 and 145. Here, energy source interface 108 is decoupled from regulator 130 and electrochemical capacitor 138 is decoupled from energy source interface 108 and biasing input 146. Electrochemical capacitor 138 is switchably decoupled from energy source interface 108 to avoid a voltage at electrochemical capacitor 138 that exceeds its maximum operating voltage. Here, regulator 130 receives electrical energy from auxiliary energy source 116 and generates the main supply voltage therefrom The nominal operating voltage of auxiliary energy source 116 is large enough to operate PA 136 for efficient high power transmission without use of electrochemical capacitor 138.

Preferably, control circuitry 120 detects the availability of auxiliary energy source 116 using voltage detection at a predetermined voltage, where a voltage comparator (not shown) is included in control circuitry 120. Here, control circuitry 120 opens switch circuits 132 and 140 when a voltage at energy source interface 108 is greater than the nominal operating voltage of main energy source 110, or when a voltage at energy source interface 114 is equal to or greater than the nominal operating voltage of auxiliary energy source 116 or the maximum operating voltage of electrochemical capacitor 138. Alternatively, for example, control circuitry 120 opens switch circuits 132 and 140 in response to a signal from a mechanical switch (not shown) that is actuable only by auxiliary energy source 116.

Preferably, main energy source 110 includes a battery (or batteries) having a size and weight suitable for hand-held portability, and may be a battery pack. A battery pack typically includes at least one battery cell with a suitable packaging and mechanism for being carried on and connected to mobile station 102. The batteries may be off-the-shelf, alkaline batteries. Energy source interface 108 may be any suitable battery or battery pack interface. Also preferably, auxiliary energy source 116 is a battery of an automobile, where energy source interface 114 is any suitable multi-pin connector interface common to many cellular telephones. For example, energy source interface 114 may be a multi-pin connector interface configured to connect with a cigarette-lighter interface of an automobile using a suitable connector.

Several system configurations are possible. In one configuration, main energy source 110 is a lithium ion battery providing a nominal operating voltage of about 3.6 volts and auxiliary energy source 116 is a battery of an automobile providing a nominal operating voltage of about 13.8 volts. Electrochemical capacitor 138 has a capacitance of about 0.07 farads and a maximum operating voltage of about 4.8 volts. Regulator 130 generates a main supply voltage of about 2.7 volts.

In another configuration, main energy source 110 is a single cell battery providing a nominal operating voltage of about 1.5 volts and auxiliary energy source 116 is a lithium ion battery providing a nominal operating voltage of about 3 volts. Electrochemical capacitor 138 has a capacitance of about 0.07 farads and a maximum operating voltage of about 2.4 volts. Regulator 130 generates a main supply voltage of about 0.9 volts.

Control circuitry 120 may also switchably decouple electrochemical capacitor 138 in response to other system conditions. For example, main energy source 110 may be a rechargeable energy source and have a fully charged operating voltage that is considerably greater than its nominal operating voltage. Electrochemical capacitor 138 is chosen with a maximum operating voltage greater than the nominal operating voltage of main energy source 110 but less than the fully charged operating voltage. When main energy source 110 is recharged at the fully charged operating voltage and connected to energy source interface 108, control circuitry 120 operates to open switch circuit 140 via control line 144 (decoupling electrochemical capacitor 138) while keeping switch circuit 132 closed for operation. Control circuitry 120 keeps switch circuit 140 open until main energy source 110 provides an operating voltage that is less than the maximum operating voltage.

As another example, control circuitry 120 may decouple electrochemical capacitor 138 in response to operating modes of mobile station 102. For example, mobile station 102 operates in a standby mode of operation (low power mode) and a talk mode of operation (high power mode). During the standby mode, mobile station 102 operates to receive a page or a call, where electronic circuit 106 draws a relatively small current from main energy source 110. Several circuits of electronic circuit 106, such as transmitter 124, are powered down and not in use in the standby mode. During the talk mode, mobile station 102 operates to communicate to base station 104 with voice or data signals, where electronic circuit 106 draws a relatively large current from main energy source 110. Several additional circuits of electronic circuit 106 are in use, such as transmitter 124 and PA 136 which draw much current during each transmit time slot. With main energy source 110 being used for operation, control circuitry 120 closes switch circuit 140 during the talk mode and opens switch circuit 140 during the standby mode. Electrochemical capacitor 138 is decoupled during the standby mode to avoid current leakage, thereby reducing the power consumption of mobile station 102. Preferably, electrochemical capacitor 138 is decoupled for a substantial duration of the standby mode; lesser durations, however, are still beneficial. This example is readily combinable with the examples and embodiments described above (e.g., when auxiliary energy source 116 is available, switch circuit 140 is open during the talk mode).

It is understood that energy source interface 108 may be switchably coupled to an energy storage circuit other than one referred to as an electrochemical capacitor, such as a capacitor, a supercapacitor, an ultracapacitor, or other suitable circuit. An electrochemical capacitor is preferred since it is much smaller in size than traditional dielectric or electrolytic capacitors having the same capacitance. It is also understood that electrochemical capacitor 138 may be switchably coupled to a load other than PA 136.

Figure 2:
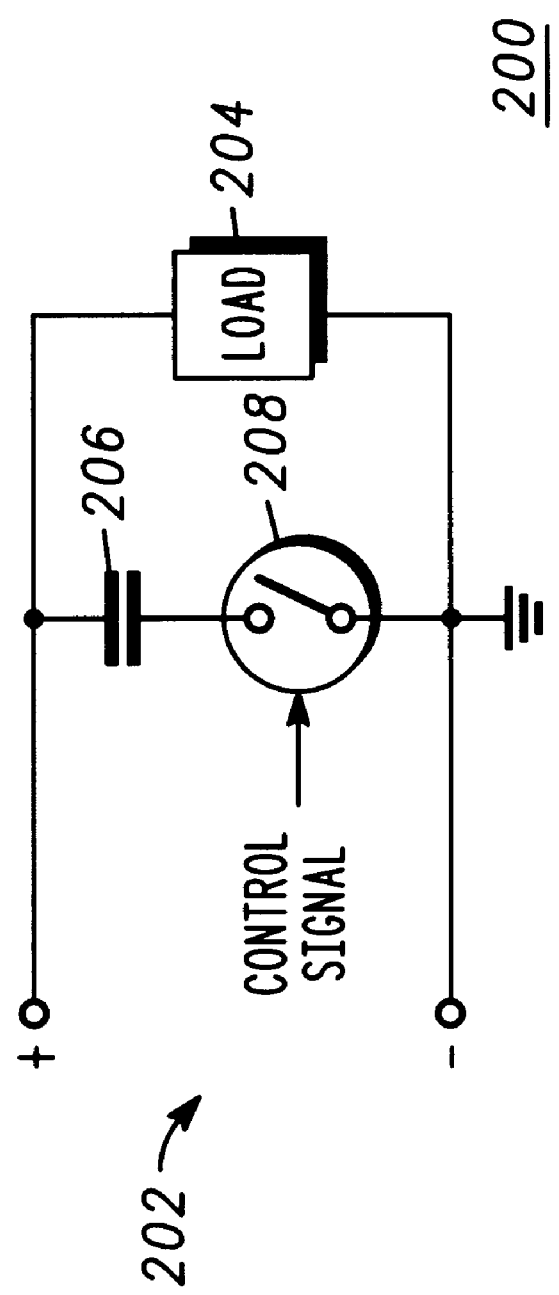

FIG. 2 is a schematic block diagram of an electronic circuit 200 of a simplified alternative embodiment. Electronic circuit 200 includes an energy source interface 202, a load 204, an energy storage circuit 206, and a switch circuit 208. Load 204 is coupled in parallel with energy source interface 202. Energy storage circuit 206 is coupled in series with switch circuit 208, and energy storage circuit 206 and switch circuit 208 are coupled in parallel with energy source interface 202.

Electronic circuit 200 is configured and operates similar to that of electronic circuit 106 of FIG. 1. Energy source interface 202 is configured for coupling with a first energy source and a second energy source (both not shown), each used separately for electrically powering load 204. The first energy source provides a first nominal operating voltage, and the second energy source provides a second nominal operating voltage that is greater than the first nominal operating voltage and greater than a maximum operating voltage of energy storage circuit 206.

When the first energy source is coupled to and available at energy source interface 202, switch circuit 208 is closed. Energy storage circuit 206 is coupled to energy source interface 202 and is provided for efficiency and for reducing low voltage drops due to high current demands of load 204. When the second energy source is coupled to and available at energy source interface 202, switch circuit 208 is opened. Energy storage circuit 206 is decoupled from energy source interface 202 to avoid a voltage at energy storage circuit 206 that exceeds the maximum operating voltage. The higher nominal operating voltage provided from the second energy source reduces the need for coupling energy storage circuit 206 with energy source interface 202.

Preferably, switch circuit 208 operates in response to detecting a voltage from energy source interface 202 that is greater than a predetermined voltage, using a voltage comparator (not shown). Here, switch circuit 208 is configured to open when a voltage at energy source interface 202 is greater than the first nominal operating voltage or equal to or greater than the second nominal operating voltage or the maximum operating voltage. Alternatively, for example, switch circuit 208 is configured to open in response to a signal from a mechanical switch (not shown) that is actuable only by the second energy source.

In the preferred embodiment, energy storage circuit 206 is a capacitor or an electrochemical capacitor and load 204 is a power amplifier as described in relation to FIG. 1. In addition, switch circuit 208 includes a power FET or a MEMS as described in relation to FIG. 1. The first and the second energy sources are portable energy sources, such as batteries or battery packs (preferably including alkaline and/or lithium ion batteries) as described in relation to FIG. 1. Switch circuit 208 may operate in response to low and high power modes as described in relation to FIG. 1. Thus, combinations of aspects of the embodiments of FIGS. 1 and 2 are readily apparent and understood.

Thus, an electronic circuit in accordance with the present invention helps reduce the power consumption and the size of a portable electronic device. For example, a portable electronic device utilizing electronic circuit 200 can operate with a small battery and energy storage circuit 206 for efficient operation, or with a larger battery having a nominal operating voltage that is adequate for efficient operation and that exceeds the maximum operating voltage. By choosing the maximum operating voltage to be below the nominal operating voltage of the larger battery, the size of energy storage circuit 206 and the portable electronic device is reduced.

While particular embodiments of the present invention have been shown and described, modifications may be made. For example, such a circuit may be useful in a portable radio communication device that operates in a system other than a PDC system, such as a Group Special Mobile (GSM) system. It is therefore intended in the appended claims to cover all such changes and modifications which fall within the true spirit and scope of the invention.

What is claimed is:

1. An electronic circuit for a portable electronic device, the electronic circuit comprising:

a first energy source interface;

a load, said load directly coupled to said first energy source interface;

an energy storage circuit coupled to said first energy source interface and said load, said energy storage circuit having a maximum operating voltage;

a switch circuit, said switch circuit coupled to said first energy source interface in series with said energy storage circuit; and a control circuit to control said switch circuit to switchably decouple said energy storage circuit from said first energy source interface and said load in response to said control circuit detecting a voltage at said first energy source interface that exceeds the maximum operating voltage of said energy storage circuit.

2. The electronic circuit according to claim 1, wherein said energy storage circuit comprises a capacitor.

3. The electronic circuit according to claim 1, wherein said energy storage circuit comprises an electrochemical capacitor.

4. The electronic circuit according to claim 1, wherein said load comprises a power amplifier.

5. The electronic circuit according to claim 1, wherein said switch circuit comprises a field-effect transistor.

6. The electronic circuit according to claim 1, wherein said switch circuit comprises a microelectromechanical system.

7. The electronic circuit according to claim 1, wherein said first energy source interface is configured for coupling with a first energy source and a second energy source, the first energy source providing a first nominal operating voltage and the second energy source providing a second nominal operating voltage different from the first nominal operating voltage.

8. The electronic circuit according to claim 1, wherein said first energy source interface is configured for coupling with a first energy source, the first energy source providing a first nominal operating voltage, said electronic circuit further comprising:
a second energy source interface, said second energy source interface coupled to said load and configured for coupling with a second energy source, the second energy source providing a second nominal operating voltage different from the first nominal operating voltage.

9. A portable electronic device, comprising:
a first energy source interface, said first energy source interface configured for coupling with a first energy source;
a second energy source interface, said second energy source interface configured for coupling with a second energy source;
a transmitter, said transmitter including a power amplifier;
an energy storage circuit;
a first switch circuit, said first switch circuit connected in series with said energy storage circuit to a biasing input of said power amplifier; and
control circuitry, said control circuitry coupled to said first switch circuit.

10. The portable electronic device according to claim 9, wherein said energy storage circuit comprises a capacitor.

11. The portable electronic device according to claim 9, wherein said energy storage circuit comprises an electrochemical capacitor.

12. The portable electronic device according to claim 9, wherein a maximum operating voltage of said energy storage circuit is less than a second nominal operating voltage of the second energy source.

13. The portable electronic device according to claim 9, wherein said control circuitry is operative to open said first switch circuit in response to the second energy source being available at said second energy source interface.

14. The portable electronic device according to claim 9, wherein said control circuitry is operative to open said first switch circuit in response to a voltage at said biasing input that is greater than a maximum operating voltage of said energy storage circuit.

15. The portable electronic device according to claim 9, wherein said first switch circuit comprises a microelectromechanical switch.

16. The portable electronic device according to claim 9, further comprising:
a second switch circuit, said second switch circuit connected between said first energy source interface and said biasing input.

17. The portable electronic device according to claim 9, further comprising:
a second switch circuit, said second switch circuit connected between said first energy source interface and said biasing input, and wherein said control circuitry is operative to open said first switch circuit and said second switch circuit in response to the second energy source being available at said second energy source interface.

18. A portable radio communication device, comprising:
a first energy source interface, said first energy source interface configured for coupling with a portable energy source;
a transmitter, said transmitter including a power amplifier having a biasing input;
an electrochemical capacitor, said electrochemical capacitor having a maximum operating voltage;
a first switch circuit, said first switch circuit coupled to said biasing input in series with said electrochemical capacitor; and
control circuitry, said control circuitry coupled to said first switch circuit, said control circuitry operating to open said first switch circuit to avoid a voltage at said electrochemical capacitor that exceeds the maximum operating voltage.

19. The portable radio communication device according to claim 18, further comprising:
a second energy source interface, said second energy source interface configured for coupling with an auxiliary energy source.

20. The portable radio communication device according to claim 19, further comprising:
a second switch circuit, said second switch circuit serially connected between said first energy source interface and said biasing input.

21. The portable radio communication device according to claim 18, wherein said first switch circuit comprises a field-effect transistor (FET).

22. The portable radio communication device according to claim 18, wherein said first switch circuit comprises a microelectromechanical system.

23. A portable electronic device, comprising:
a load, said load operating in at least a low power mode and a high power mode;
an energy storage circuit;
a first switch circuit, said first switch circuit connected in series with said energy storage circuit to said load; and
control circuitry, said control circuitry coupled to said first switch circuit, said control circuitry operative to close said first switch circuit in response to the high power mode, said control circuitry operative to open said first switch circuit in response to the low power mode.

24. The portable electronic device according to claim 23, wherein said load comprises a power amplifier.

25. The portable electronic device according to claim 23, wherein said energy storage circuit comprises a capacitor.

26. The portable electronic device according to claim 23, wherein said control circuitry is operative to open said first switch circuit during the high power mode in response to a voltage at said load being greater than a maximum operating voltage of said energy storage circuit.

27. The portable electronic device according to claim 23, wherein said portable electronic device comprises a portable radio communication device, said load comprises a power amplifier, and the low power mode is a standby mode of said portable radio communication device and the high power mode is a talk mode of said portable radio communication device.

\* \* \* \* \*